Oct. 27, 1936.　　　E. S. SMITH, JR　　　2,059,152
TELEMETRIC CONTROLLER
Filed Dec. 11, 1935　　　6 Sheets-Sheet 1

Fig. 1

INVENTOR
Ed S. Smith, Jr.
BY Maxwell Barus
ATTORNEY

Oct. 27, 1936.   E. S. SMITH, JR   2,059,152
TELEMETRIC CONTROLLER
Filed Dec. 11, 1935   6 Sheets-Sheet 2

Fig. 2

INVENTOR
Ed S. Smith, Jr.
BY Maxwell Barus
ATTORNEY

Oct. 27, 1936.    E. S. SMITH, JR    2,059,152
TELEMETRIC CONTROLLER
Filed Dec. 11, 1935    6 Sheets-Sheet 4

INVENTOR
Ed S. Smith, Jr.
BY Maxwell Barus
ATTORNEY

Oct. 27, 1936.  E. S. SMITH, JR  2,059,152
TELEMETRIC CONTROLLER
Filed Dec. 11, 1935  6 Sheets-Sheet 5

Fig. 5

INVENTOR
Ed S. Smith, Jr.
BY Maxwell Barus
ATTORNEY

Oct. 27, 1936.　　E. S. SMITH, JR　　2,059,152
TELEMETRIC CONTROLLER
Filed Dec. 11, 1935　　6 Sheets-Sheet 6

Fig. 6

INVENTOR
Ed S. Smith, Jr.
BY
Maxwell Barus
ATTORNEY

Patented Oct. 27, 1936

2,059,152

UNITED STATES PATENT OFFICE 2,059,152

TELEMETRIC CONTROLLER

Ed S. Smith, Jr., Providence, R. I., assignor to Builders Iron Foundry, Providence, R. I., a corporation of Rhode Island Application December 11, 1935, Serial No. 53,994

39 Claims. (Cl. 137—152.5)

My invention relates to methods of and apparatus for telemetric control of a dependent quantity, or quantities, by a master quantity.

A principal object of my invention is broadly to provide a master control system for a variable quantity in which both the master quantity and dependent quantity are cyclically telemetered by signals of corresponding duration, and having the control means function to reduce the difference between successive signals so that the variable quantity approaches the master quantity.

A particular object of my invention is to provide a method and means for cyclically controlling a variable flow rate by a master quantity in response to signals corresponding in duration therewith.

A further object of my invention is to provide such a flow controller with a flow responsive means equally sensitive and responsive throughout its entire range.

A further object is to provide, in such a combination, a valve and cyclically actuatable operating means therefor. In other words, I aim to provide a system using regular cycles with a quantity-responsive element having a constant lag regardless of the absolute value of the quantity, in combination with controlling means responsive to said cyclical signals so as to adjust the quantity by amounts proportional to the telemetered signals regardless of the absolute value of the quantity. My chief purpose is thus to provide a flow controller of the utmost rapidity of action consistent with a minimum tendency to hunt.

Still a further object of my invention is to provide improved combinations for multiple and/or proportioning flow rate control of fluids.

I further teach the setting of a number of dependent flow rates from a single transmitter. In this connection, I teach the telemetric proportioning control of the rates of several fluids in proportion to that of a master fluid and further, in such combination, I teach the telemetric setting of the individual dependent flows through the adjustment of their respective adjustable orifices.

In addition to the above-mentioned objects covering the control of the flow rate of fluids, my object is to teach the accurate telemetric setting of an adjustable orifice from a master transmitter.

These and such other objects of my invention as may hereinafter appear from the following specification and drawings are intended to be claimed in the hereinafter appended claims.

This application is a continuation-in-part of my application Serial No. 728,730, filed June 2, 1934, which illustrates a specific example of the broad invention here disclosed and claimed.

In the drawings, wherein like characters of reference indicate like parts throughout.

Fig. 6 is a diagrammatic view, generally in side elevation and partially in section. This shows a master transmitter governed by flow through one conduit and a number of flow rates individually controlled proportional to the master rate, and a telemetrically set master control, the proportion being determined by an adjustable orifice telemetrically set as in Fig. 5.

Figure 1:
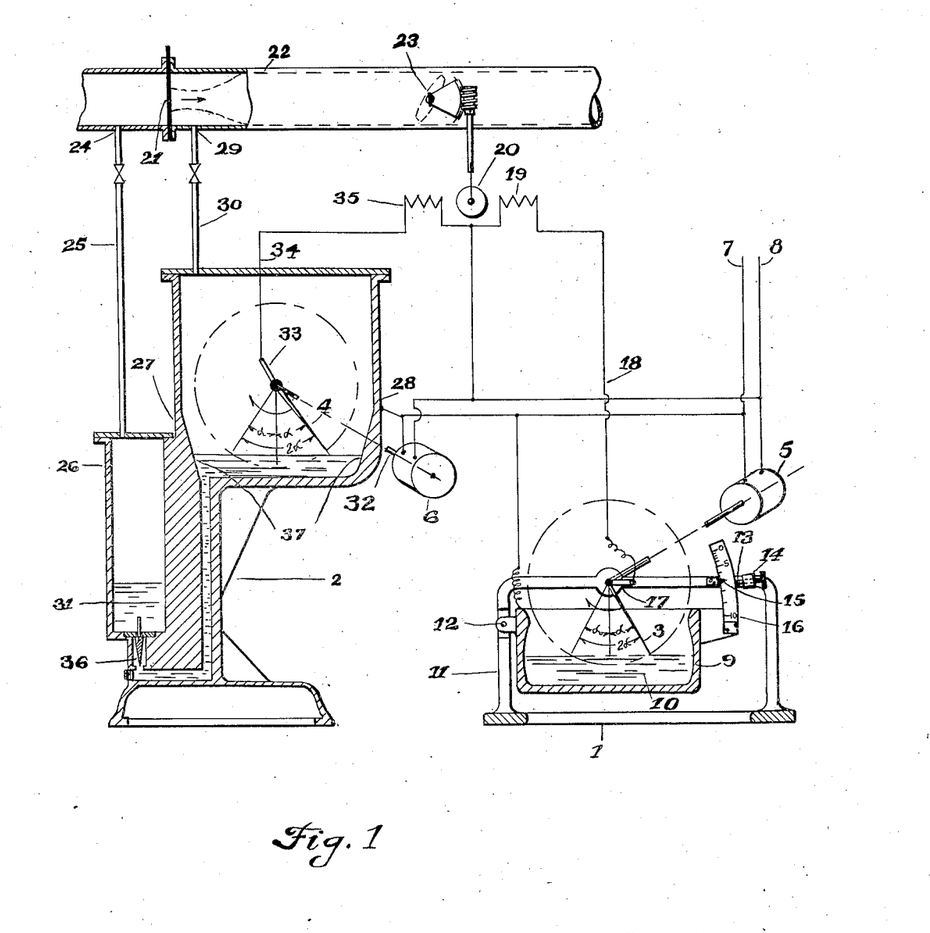
Fig. 1 is a side elevation, partially in section and partially in perspective, showing a cyclically operable master transmitter and a cyclically operable actual transmitter for rate of flow through an orifice, and a control valve operated by the difference of the two transmitters. The cyclically operable transmitters shown in this figure are of a type that generate cyclical signals without the use of cams.

In Fig. 1, master transmitter 1 and actual flow rate transmitter 2 each has continuously rotated contactors 3 and 4 respectively. These are both driven in a clockwise direction by, e. g. 4 R. P. M., synchronous motors 5 and 6 respectively, both motors being continuously connected to A. C. supply lines 7 and 8. Master transmitter 1 has tiltable container 9 for a body of mercury 10, pivotally mounted on base 11 by shaft 12. The side walls of container 9 are so curved as to be concentric with an axis parallel to the axis of shaft 12. Motor 5 is rigidly mounted on base 11. Index 15 on base 11 is adjacent to scale 16 affixed to mercury container 9. The end 13 of base 11 opposite to shaft 12 is provided with manually operable clamping means 14 for scale 16. The zero of scale 16 is so placed as to be opposite index 15 when contactor 3 barely fails to contact the surface of the mercury 10. The graduations on the scale are for increasing values of the flow rate as their distance increases from the zero of scale 16. The graduations are spaced substantially as the square of the flow rate, with the correction noted below. With index 15 and scale 16 at the graduations shown, contactor 3 will co-act with the mercury through an angle $2\alpha$ for a corresponding time interval. The time interval of contact between contactor 3 and the mercury is proportional to the flow rate, since the angle $\alpha$ is substantially proportional to the square root of its versed sine for values of angle $\alpha$ up to approximately forty-five degrees, as has been noted in my Patent No. 2,003,839, dated June 4, 1935. A slight deviation from true square spacing is made on scale 16 to correct the deviation of the versed sine from the true square root relationship so that the time duration of contact between contactor 3 and mercury 10 is truly proportional to the rate of flow indicated by the pointer 15 on the scale 16. Contactor 3 is insulatedly mounted on the shaft of motor 5 and provided with brush contactor 17 continuously in contact with contactor 3. A. C. supply line 7 is connected through container 9 to mercury 10. Brush 17 is connected by telemetric line 18 with one end of opening coil 19 of reversible motor 20; the other end of opening coil 19 being connected to other A. C. supply line 8. In other words, contactor 3 is cyclically connectable with opening coil 19 by master transmitter 1 for times corresponding with the flow rate set on scale 16. Actual rate transmitter 2 is connected to opposite sides of orifice plate 21 in conduit 22 which also contains valve 23 adapted to be actuated in any cycle by reversible motor 20 according to the difference in duration of the signals in said cycle from the respective transmitters 1 and 2. Pressure tap 24 is connected by pipe 25 with the high pressure leg 26 of U-tube 27, the other leg 28 of which contains contactor 4 continuously rotatable by its motor 6. Pressure tap 29 downstream of orifice 21 is connected by pipe 30 with the top of U-tube leg 28. Manometric liquid 31 in U-tube 27 is mercury. The amount of mercury 31 is such that at zero rate of flow of fluids through conduit 22, and hence zero pressure differential, the contactor 4 will barely miss the surface of the mercury as it sweeps around. Contactor 4 is insulatedly mounted on shaft 32 of motor 6 and continuously connected by brush 33 with telemetric line 34 to one end of closing coil 35 of reversible motor 20; the other end of coil 35 being continuously connected to A. C. supply line 8. Other A. C. supply line 7 is connected to metal leg 28 and hence with mercury 31. Conical check valve 36 is provided at the bottom of leg 26 to limit the rise of mercury 31 in U-tube leg 28 to a point about mid-way between a lowermost position of the end of contactor 4 and the center line of shaft 32 so that the maximum angle of contact $2\alpha$ cannot materially exceed twice the angle whose cosine is $\frac{1}{2}$. Sides 37 of U-tube leg 28 are formed to have a slope that corrects for the difference between the versed sine—square root relationship, as taught in Patent No. 2,003,839. Contactors 3 and 4 are continuously rotated in synchronism so that contactors 3 and 4 simultaneously pass their vertical positions, thus giving a symmetrical signal about this point.

The operation of my device as shown in Fig. 1 is as follows:

The operator sets the desired rate at the master transmitter 1 by positioning bowl 9 relative to the contactor 3 so that the latter makes contact for a time duration in each cycle corresponding with the desired rate as shown by the position of index 15 on scale 16. Assuming that the desirable control rate has been raised to a higher value than the actual rate, it is apparent that master transmitter 1 telemeters signals of longer duration through line 18 to opening coil 19 of reversible motor 20 than actual rate transmitter 2 telemeters through line 34 to closing coil 35 of reversible motor 20. Current signals from A. C. supply lines 7 and 8 thus will be longer through opening coil 19 than through closing coil 35 so that twice in each cycle the reversible motor 20 will operate to move valve 23 so that it gradually approaches its proper position. Butterfly valve 23 moves shorter and shorter distances in each cycle as the proper position is approached, a matter of practical importance in controlling without hunting.

Obviously the action above described is reversed in case it is desired to set the control to a lower rate. The characteristics of butterfly valve 23 provide a desirable graduating effect as its closed position is reached. A great advantage of my controller is that after each controlling movement of valve 23, it must wait, during the sweep of contactors 3 and 4 above the mercury in the respective transmitters, until the mercury 31 in actual rate transmitter 2 has a chance to substantially fully respond to the changed rate of flow through orifice 21, before valve 23 can again be actuated. The speed of motors 5 and 6 should be such as to permit said response of the mercury in transmitter 2 to the changed flow rate resulting from operation of valve 23. This advantage I attain without requiring the additional use of separate interrupters. It should be clear that the accuracy of operation of my control is not dependent upon close regulation of the frequency in the A. C. supply lines 7 and 8 since motors 5 and 6 both follow along synchronously any changes in the frequency.

Figure 2:
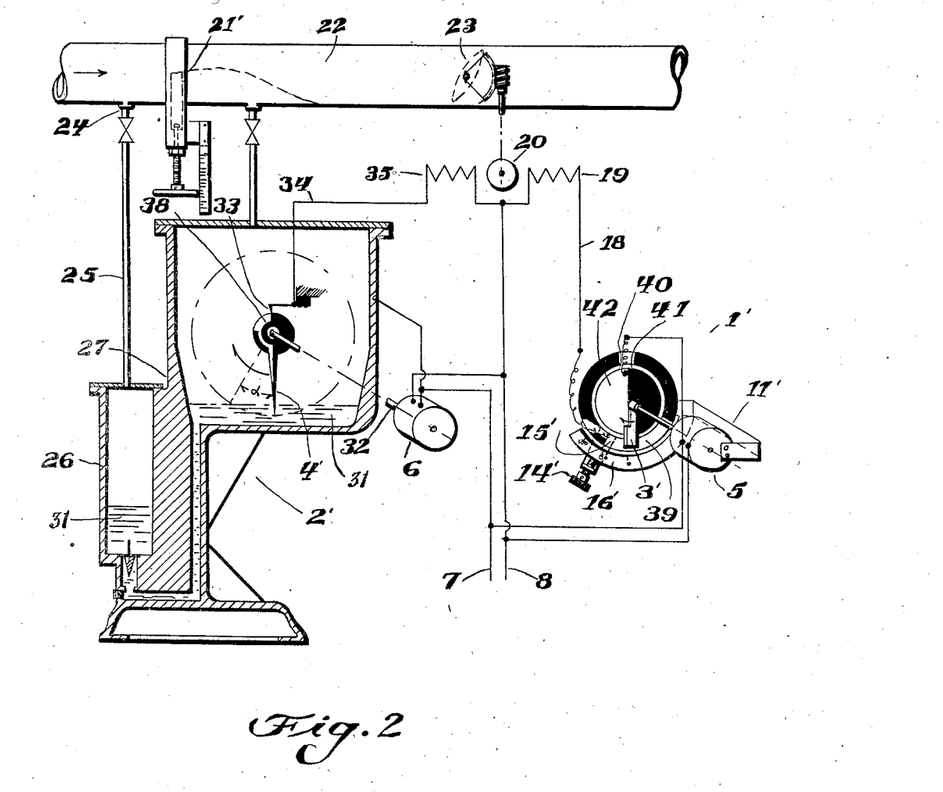
Fig. 2 is similarly a side elevation, partially in section and partially in perspective, showing a cyclically operable master transmitter producing signals starting at a fixed point and an actual rate transmitter for flow through the manually adjustable orifice, likewise cyclically setting up signals at a fixed point in each cycle simultaneously with the master transmitter, and a control valve operated by the difference between the two transmitters. The cyclically operable transmitters shown in this figure are of a type that generate signals simultaneously starting at a fixed point in each cycle without the use of cams.

In Fig. 2, master transmitter 1' has been modified to start the signal at a fixed point in each cycle. Actual flow rate transmitter 2' has been modified so as to also start the signal at a fixed point in each cycle. The two transmitters operate in synchronism and transmit their signals simultaneously from corresponding fixed points. The reversible motor 20 and butterfly valve 23 in conduit 22 are as before described under Fig. 1. Manually adjustable orifice 21' may be used to roughly set a control rate at the conduit and to shut the line down at any time by merely moving adjustable orifice 21' into its closed position. A. C. supply lines 7 and 8 and the U-tube 27 also are as before. The contactor 4' has been modified so that brush 33 is no longer continuously connected with it. Instead brush 33 is electrically connected with contactor 4' for a period of time determined by conductor segment 38. The electrical connection between brush 33 and contactor 4' starts at a fixed point in each cycle, preferably at or near the lowermost vertical position of contactor 4'. Master transmitter 1' has contactor 3' rotated as before by synchronous motor 5 which is mounted on base 11'. Scale 16' shows the desired flow rate. Index 15' attached to conductor segment 39 is held in position at the desired rate by manually adjustable clamping screw 14'. Attached to base 11' is fixed disc 40, the right half 41 of which consists of insulation; while the left half 42, is of conducting metal continuously connected with A. C. supply line 7. When index 15' is on the zero of scale 16', the division between conductor segment 39 and its insulation is so positioned with respect to the lower division of half sections 41 and 42 of stationary disc 40, that no current flows though contactor 3' during the sweep of the latter. Transmitters 1' and 2' are respectively connected to windings 19 and 35 of reversible motor 20 by telemetric lines 18 and 34, as in Fig. 1.

The operation of my device is generally as before except that it should be apparent from Fig. 2 and the foregoing description that, by operating contactors 3' and 4' continuously in synchronism, only one controlling impulse in each cycle can exist to operate reversible motor 20. This has the further advantages that the valve moves only half as often as in the embodiment of Fig. 1 and also that the impulses are initiated simultaneously in each cycle. The correcting impulses in Fig. 2, moreover, occur at equal time intervals instead of at intervals appreciably influenced by the flow rate. This gives the manometric liquid 31 in the U-tube 27 time to substantially fully respond to any changes so that with a valve 23 of given characteristics, there exists a minimum tendency to hunt. Theoretically, to correspond with uniform time of response, the characteristics of valve 23 should be such as to produce a given percent change in the flow rate for each unit of time that reversible motor 20 operates. Valve 23, being of the butterfly type, has approximately such a logarithmic-type characteristic.

It may be noted that in the embodiment shown in Figure 2 a particularly wide range of control of the flow rate is obtained, since the orifice plate 21' may be adjusted to any of a variety of positions and the position of conducting segment 39 varied for any of the positions to which said orifice plate is set. More particularly, by manually changing the position of the orifice plate to alter the area of the orifice the differential pressure is changed and the signals created by the transmitter 2' correspond in time duration with said changed differential pressure. The signals created by transmitter 1' also correspond in time duration with the differential pressure value for which said transmitter 1' is set. Valve 23 is operated by motor 20 under the joint control of the signals from transmitters 1' and 2' until the time durations of said signals become equal. The flow rate now is equal to the product of the area of the orifice and the square-root of the differential pressure predetermined by the setting of transmitter 1'. Thus it will be clear that through the provisions herein disclosed for altering both the area of the orifice and the differential pressure, the flow rate may be varied throughout wide limits. The ordinary limits of a controller having a fixed orifice, such as shown in Figure 1, are 50% above and 50% below the rated normal control rate, i. e., a range of from 33 to 100 percent of the maximum control rate. However, the upper 25% cannot safely be used on account of the danger of exceeding the maximum. Consequently the useful range of such a controller is approximately from 33 to 75% of the maximum rate, or a 1 to 2.25 range. The construction shown in Fig. 2 enables the attainment of a markedly extended range of control, of the order, for example, of 10 to 1 at the orifice and 2.25 to 1 at the transmitter, giving a total range of 22.5 to 1.

Figures 3, 3A:
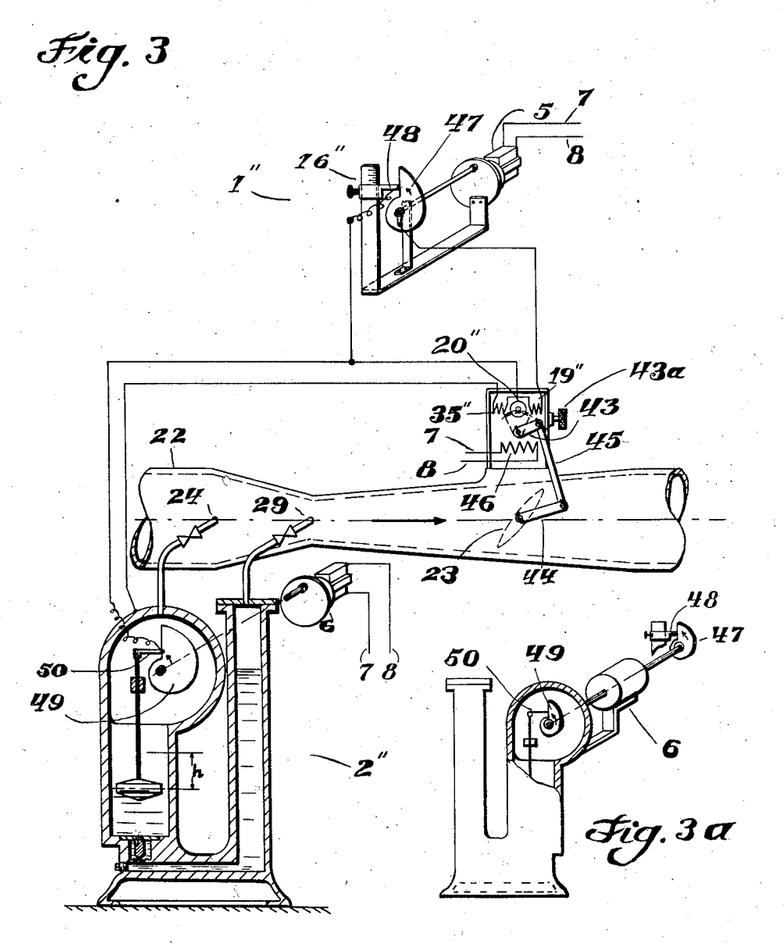
Fig. 3 is similarly a side elevation, partially in section and partially in perspective, of the embodiment of my invention preferred for filtration plant use, in which the flow through a Venturi tube actuates an actual rate transmitter, and a valve in the recovery cone of the Venturi tube operates to bring master rate and actual flow rate together. These transmitters use cams that simultaneously start signalling impulses at a fixed point in each cycle.
Fig. 3a shows a modification of the arrangement illustrated in Fig. 3.

In Fig. 3, master transmitter 1'' has been shown as including a lineal cam 47 that, as in Fig. 2, is adapted to sweep past contactor 48 manually set in relation to first-power scale 16''. Actual flow rate transmitter 2'' has a square-root cam 49 adapted to touch contactor 50 at a fixed point in each cycle. By the use of synchronous motors 5 and 6, the same point is used for starting the signal for both transmitters. In conduit 22, to which high pressure tap 24 is connected, the differential producer is a Venturi tube having a throat of reduced cross-sectional area to which low pressure tap 29 is connected. Reversible motor 20'' is shown mounted on the downstream cone of the Venturi tube above the butterfly valve 23 mounted in said downstream cone. Crank 43 is mounted on reversible motor 20''. Valve 23 has connected to it crank 44. The outer ends of cranks 43 and 44 are pivotally connected to the ends of link 45. The proportions and arrangement of cranks 43 and 44 and link 45 are such that motor 20'' moves a relatively great distance for a slight movement of valve 23 when this valve is in its nearly closed position. This gives substantially the desired logarithmic-type relation between the movement of reversible motor 20'' and the effect on the flow through the Venturi meter. A. C. supply lines 7 and 8 are connected with synchronous motors 5 and 6 driving the transmitters and with reversible motor 20''. Reversible motor 20'' has a field coil 46 continuously connected to A. C. supply lines 7 and 8. Opening and closing shading coils 19'' and 35'' respectively are connected to their transmitters 1'' and 2''. The motor is shown only diagrammatically and is of a well-known type wherein the shading coils 19'' and 35'' act as secondary windings of a transformer, of which the field coil 46 is the primary. When both coils are open or shorted, the motor 20'' is locked in position, but when either coil 19'' or 35'' alone is shorted the motor 20'' will operate. It may be noted that the horizontal axle of elliptical valve 23 is located above the horizontal axis of the expanding cone of the Venturi tube and so that it is at the minor axis of the elliptical valve disc.

The operation of my preferred embodiment, shown in Fig. 3, is generally as that of Fig. 1, and particularly nearly that of Fig. 2 in that the transmitters cyclically operate to produce signals starting simultaneously and ending as the trailing edge of the master and actual rate cams 47 and 49 leave their contactors 48 and 50. These cam-type transmitters have been found advantageous in production commercially as permitting standardization of units with both lineal and square-root relations. The use of the shading coil type of reversible motor 20″ with the field coil 46 continuously alive has the advantage of retaining the armature in its then position between operations, due to inherent electric brake action. The shading coils 19″ and 35″ operate at an induced voltage only, so that the signalling circuits to the transmitters carry minimum operating hazards. The relation of the cranks and connecting link for the butterfly valve also produce an excellent control characteristic, in fact, the ideal at a given rate, as has been noted. The location of the butterfly valve in the downstream cone of the venturi tube gives better "filling" of this cone by the flowing stream and so assists in the efficiency of this combination by producing minimum loss of head when valve 23 is wide open, and also gives easier operation of such a valve due to its reduced diameter. The location of the motor above, or at least not below, the stuffing box of valve 23 protects the motor and its wiring from water dripping from the stuffing box. In short, the entire combination is ideal for use in water filtration plants.

It will be apparent that the shading-coil type of reversible motor shown in Fig. 3 may be employed in Figures 1 and 2 as the motors diagrammatically shown in those embodiments. Furthermore, any suitable conventional type of reversible motor may be utilized in any of the embodiments here disclosed. Magnetic brakes, well-known in the art for preventing over-travel of motors, may also be employed. The speed of the motor may be varied in any well-known manner so as to give the maximum speed of the valve 23 without hunting under a variety of conditions. A conventional speed-adjusting element 43a is illustrated for this purpose in Fig. 3.

In Fig. 3a, I have shown the cams 47 and 49 mounted on the same shaft and driven by the motor 6. This arrangement provides a particularly compact control unit and avoids the provision of synchronizers as well as the need for two transmitter motors. The control effected by the cams is the same as that described in connection with Fig. 3.

Figures 4, 4A, 4B:
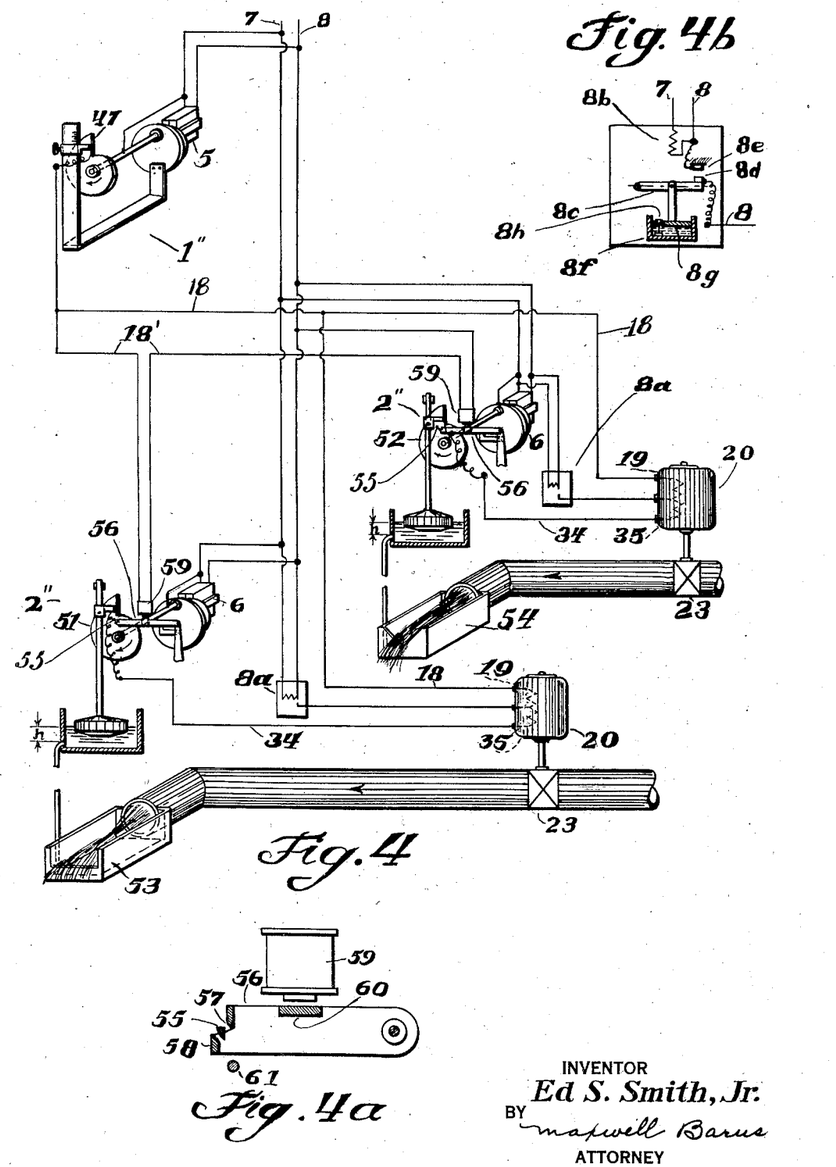
Fig. 4 is a diagrammatic view, partially in perspective and partially in section, showing a master control transmitter actuating a number of flow rate controllers each of which is provided with a synchronizer.
Fig. 4a is a side elevation of a detail of the synchronizers.
Fig. 4b is a diagrammatic view of a detail of means for inhibiting control until the synchronizers have had time to function.

In Figure 4, master transmitter 1″ has a lineal cam and is of the same type as in Fig. 3. Actual rate transmitters 2″ have non-lineal cams 51 and 52 to fit their respective differential producers 53 and 54, respectively rectangular and V-notch weirs; 53 being shown as a rectangular weir in which the volume-rate of flow is proportional to the 1½ power of the head, while 54 is a V-notch weir in which the volume-rate of flow is substantially proportional to the 2½ power of the head. Otherwise the operation of transmitter 2″ is as in Fig. 3. The master transmitter 1″ is arranged to control the flow of fluid over both weirs in proportion to each other, and at the rates determined by said master transmitter. Each of actual rate transmitters 2″ has attached to its cam 51 or 52, a detent pin 55 cooperating with latch 56 of the gate-type, as shown in detail in Fig. 4a. One end of latch 56 has faces 57 and 58 separated by a "gate" passage for the detent pin 55. Latch 56 is pivotally mounted at its opposite end adjacent to electro-magnetic coil 59. Armature 60 on latch 56 is adjacent to electro-magnet coil 59 so as to be lifted thereby. Latch 56 rests on pin 61, with its face 57 in the path of pin 55 as long as no current flows through coil 59 but rises when current flows through said coil so that movement of pin 55 is now unobstructed. Whenever pin 55 bears against latch 56, motor 6 stalls. If desired, however, a friction clutch might be interposed between cam 51 or 52 and its motor to permit continuance of the operation of the motor while said cam is held stationary, as will be evident. As in Fig. 1, A. C. supply lines 7 and 8 are connected to motors 5 and 6 respectively, for master and actual rate transmitters 1″ and 2″, line 7 being grounded, and to reversible motor 20, line 8 being the common wire. Circuit 18 connects master transmitter 1″ with the synchronizing coil 59 of each actual rate transmitter 2″, while circuit 18 connects master transmitter 1 with the opening coil 19 of each reversible motor 20. Wires 34 respectively connect the actual rate transmitters with the closing coils 35 of each reversible motor 20.

The operation of my master governed proportioning controller shown in Fig. 4 is as follows:

The operator sets the desired rate by master transmitter 1″ which sends out cyclical signals through line 18′ to synchronizing coils 59 of each actual rate transmitter and through line 18 to the opening coil 19 of each reversible motor 20; thus causing the latter to open its valve 23 until the signals from the actual rate transmitters 2″ over lines 34 to closing coils 35 of motors 20 create simultaneous signals of durations equal to the durations of the signals from the actual rate transmitter.

The above description assumes that the operator has increased the rate set at master transmitter 1″. The operation is reversed where a decreased rate is set.

The operation of the synchronizer shown in Figs. 4 and 4a is as follows:

Assume that none of the transmitters 1″ and 2″ is in step with any of the others at the moment when the A. C. supply lines 7 and 8 are connected therewith. Within the first cycle or two of operation of master transmitter 1″, each detent pin 55 will have contacted at least face 57, or faces 57 and 58, of latch 56 which is raised by electro-magnet 59 at the beginning of each signalling current from master transmitter 1″. Assuming that the latch 56 of one transmitter 2″ is resting against pin 61 when detent pin 55 of non-lineal cam 51 strikes face 57, non-lineal cam 51 will be synchronized with lineal cam 47 at the first instant that current flows from master transmitter 1″. Assuming that detent pin 55 on non-lineal cam 52 of the other actual rate transmitter 2″ abuts latch 56 when this is in a raised position due to the current flow from master transmitter 1″, this detent pin 55 will strike the lower face 58 of latch 56 and be held there until the end of the signal from master rate transmitter 1″, when the current flow ceases through coil 59 releasing armature 60 and permitting latch 56 to drop so that pin 55 next is retained by face 57 with latch 56 resting against pin 61. At the beginning of the next signal from master transmitter 1″, it is obvious that latch 56 will rise simultaneously with that of the other actual rate transmitter 2″ so that both transmitters will remain in step. As is well-known, synchronous motors 5 and 6 and master and actual rate transmitters 1″ and 2″ will remain in step as long as A. C. current is supplied by lines 7 and 8. Thus latch 56 of each synchronizer normally rises at the precise instant required for detent pin 55 to just miss face 57 so that no wear occurs here.

Reversible motors 20 in Fig. 4 may, if desired, be of the shading-coil type illustrated in Fig. 3, as will be obvious.

Means may be provided for preventing operation of either of the valve operating motors 20 during the first two cycles of operation of the master transmitter following a current interruption. For this purpose there is shown, by way of example in Fig. 4b, a detail of retarding relays 8a of Fig. 4, which may comprise a solenoid 8b in circuit with wires 7 and 8 and cooperating with switch arm 8c to raise the latter in response to a flow of current in the lines 7 and 8. When switch 8c is raised it brings a contact 8d thereof into engagement with a contact 8e, closing the circuit through the associated motor 20. A dash pot 8f delays the closing of the contacts 8d and 8e until two cycles of operation of the master transmitter are completed. Piston 8g of dash pot 8f is provided with a check 8h so that the piston may move downward freely, but is delayed in its upward movement.

Figure 5:
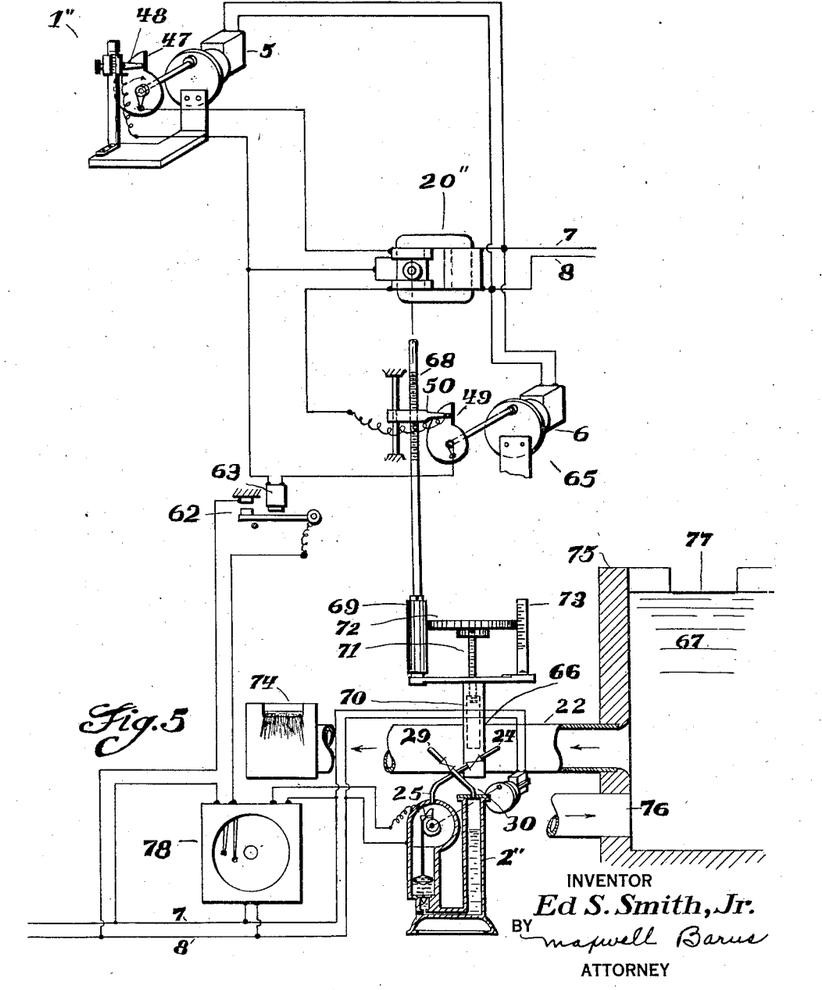
Fig. 5 is a diagrammatic view, generally in side elevation and partially in perspective, showing a master transmitter accurately controlling the position of an adjustable orifice, such as is shown also in Fig. 2.

In Fig. 5, I have shown master transmitter 1″ and an adjustable-orifice position transmitter 65 both connected to reversible motor 20″ that is operatively connected with adjustable orifice 66. Motors 5, 6 and 20″ are continuously connected with A. C. current supply lines 7 and 8. Master and orifice position transmitter cams are rotated in synchronism by motors 5 and 6 so that they simultaneously short the ends of the closing and opening coils respectively of reversible motor 20″. Contactor 50 is on threaded shaft 68 having motor 20″ at one end thereof, with long pinion gear 69 on the other end. Gate 70 of adjustable orifice 66 is raised and lowered by threaded shaft 71 having gear 72 affixed at its upper end. Shafts 68 and 71 have vertical axes spaced so that the gear 72 always is drivingly engaged by its pinion 69 regardless of the elevation of the gate 70, which elevation is shown on scale 73. High- and low-pressure taps 24 and 29, in conduit 22 adjacent to gate 70, are respectively connected by pressure pipes 25 and 30 to flow rate transmitter 2″. Conduit 22 has a discharge at a constant level at one end 74, its inlet end being led from reservoir 75. Reservoir 75 is provided with a supply inlet 76 continuously bringing in more water than will be discharged through conduit 22. This reservoir is provided with a constant level overflow 77 so as to maintain a substantially constant effective head across the control valve at all times.

The operation of my device as shown in Fig. 5, is as follows:

The operator sets the desired orifice opening at master transmitter 1″ by positioning contactor 48 with relation to the axis of cam 47. Reversible motor 20″ then turns threaded shaft 68 until contactor 50 threaded thereon as a nut moves to a corresponding position relative to the axis of its cam 49. By having cams 47 and 49 both lineal and identical, it is apparent that contactor 50 will reach a position the same distance from the axis of its cam 49 that contactor 48 is from the axis of its cam 47. Also, zero contact time corresponds with the highest position of gate 70 of the adjustable orifice 66. In any case, reversible motor 20″ will operate to cause the duration of contact between contactor 50 and cam 49 to equal that between contactor 48 and cam 47. Where it is desired to have equal displacements of contactor 48, relative to lineal cam 47, corresponding with equal flow increments, cam 49 may be so shaped as to agree with the flow-calibration of adjustable orifice 66, this flexibility constituting an important advantage of my invention. From the foregoing, it should be clear that for every position of gate 70 of the adjustable orifice 66, there will be, in fact, a corresponding volume rate of flow which would be as shown by the receiver 78 and as transmitted by actual flow rate transmitter 2″, controlled by the differential across the adjustable orifice 66 for a given gate position with variation in the height of water 67 in the reservoir 75. Receiver 78 is of the two-pen type, the second pen being positioned in accordance with the duration of the engagement of contactor 50 with its cam 49, through relay 62 having coil 63 operatively connected with cam 49 and contactor 50 so as to cause a current flow from A. C. supply lines 7 and 8 to position the second pen. Thus one may learn the actual volume rate of flow from the record of receiver 78, which shows both the opening of the adjustable orifice 66 and the differential across it. This mode of operation permits an exceedingly wide range of accurate measurement and control. It should be apparent that I have provided an improved method of telemetrically controlling flows by positioning from a distance a calibrated "adjustable orifice" valve operating under constant head, the flexibility of the cams being most convenient since a lineal cam may be used at the master transmitter and a cam shaped to fit any desired calibration at the orifice position transmitter.

Figure 6:
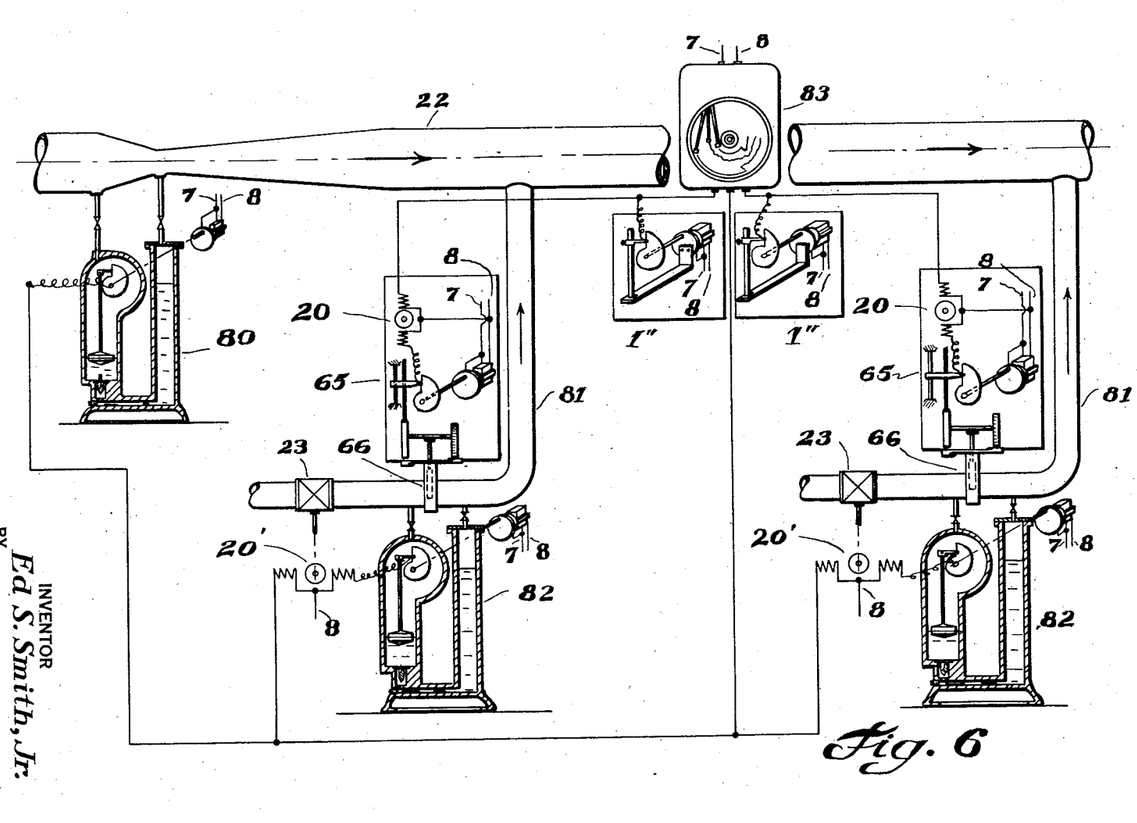

In Fig. 6, water flows through main conduit 22 and a Venturi tube. A transmitter 80 is operated in accordance with the flow as in Fig. 3. I have shown two additional conduits 81 for supplying to the conduit 22 different reagents in predetermined proportions to the main flow. Adjustable orifice 66 in each of lines 81 is positioned by a motor 20 under the control of the transmitters 1″. Each of these transmitters 1″ has a lineal cam. The reversible motor 20 is controlled not only by transmitter 1″ but also by an orifice position transmitter 65, in the manner previously described in conjunction with Fig. 5. Valve 23 in each line 81 is operated by its reversible motor 20′ controlled jointly by the main rate transmitter 80 and its reagent flow transmitter 82 so that the same differential as that in the venturi will exist across the adjustable orifices 66. Three-pen recorder 83 is provided with pens telemetrically governed by the respective transmitters 80, 1″ and 1″ to show the main flow and the proportion of each reagent thereto. As will be apparent, the various motors may, if desired, be brought into synchronism by synchronizing means shown in Figures 4 and 4a, which however, are not indicated on Fig. 6 to avoid undue complexity in this diagrammatic showing.

The operation of my device as shown in Fig. 6 is generally as shown in the preceding figures. Thus the main flow governs the main rate transmitter 80 having a square-root cam, as in Fig. 3, to cyclically produce signals corresponding in duration with the velocity of the main flow. Similarly, reagent flow through each line 81 and adjustable orifice 66 governs its rate transmitter 82 to create signals proportional to the velocity of reagent flow through its adjustable orifice. Reversible motor 20′ and valve 23 in each reagent line 81 are operated under the joint control of the signals from said transmitters 80 and 82 to control the flow rate of each reagent proportional to that of the main flow. Master transmitter 1'' telemetrically positions its respective adjustable orifice 66, in the manner shown and described under Fig. 5, to predetermine the proportion of each reagent to the main flow. Thus three-pen telemetric recorder 83 indicates the main flow and the position of each adjustable orifice in the desired reagent line 81 and hence the proportions set. From these data the actual flow rate of each reagent may be readily ascertained.

It will be evident that the construction illustrated in Fig. 6 provides utmost flexibility of installation, accuracy over a wide range, simplicity and reliability of the various individual units employed, and finally extreme precision that is obtainable through the use of the cyclical time duration signals.

It will be understood that the motor-operated valves herein illustrated may be provided with customary limit switches operated upon complete opening or closing of the valves to cut off further movement of the motors in the valve opening or closing direction respectively. The same applies to the motor-operated adjustable orifices herein disclosed.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. The method of controlling a quantity rate of flow, comprising adjusting an orifice to a predetermined setting and thereby varying the relation of the differential pressure to said quantity rate of flow therethrough, telemetering signals of a time function corresponding with said differential pressure, telemetering signals of a time function corresponding with a master quantity, and conjointly controlling said quantity rate in accordance with said telemetered signals to bring said quantity rate to a desired value.

2. The method of controlling a quantity rate of flow, comprising adjusting an orifice to a predetermined setting and thereby varying the relation of the differential pressure to said quantity rate of flow therethrough, telemetering signals of a time function corresponding with said differential pressure, telemetering signals of a time function corresponding with a master quantity, and modifying said quantity rate under the conjoint action of said signals until the latter are brought into equality with each other.

3. The method of controlling a quantity rate of flow, comprising adjusting an orifice to a predetermined setting and thereby varying the relation of the differential pressure to said quantity rate of flow therethrough, telemetering signals of a duration corresponding with said differential pressure, telemetering signals of a duration corresponding with a master quantity and modifying said quantity rate under the conjoint action of said signals until the durations of the latter are brought into equality.

4. The method of controlling a quantity, comprising altering the value of one factor of said quantity to thereby change the relation between said quantity and another factor thereof, setting up signals of a duration corresponding with the second mentioned factor, setting up signals of a duration corresponding with a master value of said second mentioned factor, and causing said second mentioned factor to attain said master value under the conjoint action of said signals.

5. The method of controlling a quantity, comprising altering the value of one factor thereof to thereby change the relation between said quantity and a second factor thereof, and causing said second factor to assume a predetermined value under the conjoint influence of signals corresponding in duration with said predetermined value and signals corresponding in duration with the actual value of said factor.

6. The method of telemetrically controlling a quantity, comprising cyclically setting up signals of a duration proportional thereto, altering the proportion between said signals and said quantity, cyclically and simultaneously setting up signals of a duration proportional to a master quantity, and conjointly controlling said first mentioned quantity to bring said durations into equality.

7. In a telemetric controller, transmitting means for cyclically telemetering signals of a duration corresponding with a master quantity, a second transmitting means for cyclically telemetering signals of a duration corresponding with a variable quantity, and means jointly responsive to said signals from both said transmitting means and adapted to alter said variable quantity so as to bring said signals into equality.

8. In a telemetric controller, transmitting means for cyclically telemetering signals of a duration corresponding with a master quantity, a second transmitting means for cyclically telemetering signals of a duration corresponding with a variable quantity, and means jointly controlled by said signals from both said transmitting means for bringing the value of said variable quantity into a predetermined relation with that of said master quantity.

9. In a telemetric controller, transmitting means for cyclically telemetering signals of a duration corresponding with a master quantity, a second transmitting means for cyclically and simultaneously telemetering signals of a duration corresponding with a variable quantity, and means jointly responsive to said signals from both said transmitting means and adapted to alter the value of said variable quantity to bring said value into correspondence with that of said master quantity.

10. In a telemetric controller, transmitting means for cyclically creating signals at a fixed point in each cycle and of a duration corresponding with a master quantity, a second transmitter for cyclically and simultaneously creating signals of a duration corresponding with a variable quantity, and means jointly responsive to said signals for bringing the value of said variable quantity into predetermined relation with that of said master quantity.

11. In a telemetric controller, transmitting means for cyclically telemetering signals of a duration corresponding with a master quantity, a second transmitting means for cyclically telemetering signals of a duration corresponding with a variable quantity, and means comprising a reversible motor jointly controlled by said signals from both said transmitting means for altering said variable quantity to bring the value thereof into a predetermined relation with that of said master quantity.

12. In a telemetric controller, transmitting means for cyclically telemetering signals of a duration corresponding with a master quantity, a second transmitting means for cyclically telemetering signals of a duration corresponding with a variable quantity, and means comprising a reversible motor jointly controlled by said signals from both said transmitting means for altering said variable quantity to bring the duration of said signals into equality.

13. In a telemetric apparatus, a transmitter for cyclically creating signals of a duration corresponding with a master quantity, a second transmitter for cyclically creating signals of a duration corresponding with a variable quantity, means jointly controlled by said signals for bringing said variable quantity into predetermined relation with said master quantity, and means for automatically restoring synchronism between said transmitters upon loss of synchronism.

14. The method of telemetrically controlling the rate of supplying a substance that comprises setting up a pressure differential proportional to the square of said supply rate, cyclically transmitting signals corresponding in duration with the square root of said pressure differential, cyclically transmitting master signalling impulses corresponding in duration with a master quantity, and controlling said supply rate according to the difference of said telemetered signals.

15. The method of telemetrically controlling the rate of flow of a fluid that comprises setting up a pressure differential proportional to the square of said flow rate, cyclically telemetering impulses corresponding in duration with the square root of said pressure differential, cyclically telemetering impulses of a duration proportional to a master quantity and controlling said flow rate according to the difference of said telemetered signals.

16. The method of telemetrically controlling the rate of flow of a fluid that comprises setting up a pressure differential proportional in a predetermined relation to the square of said flow rate, altering said relation to set the rate of control, cyclically telemetering impulses corresponding in duration with the square root of said pressure differential, cyclically telemetering impulses of a duration proportional to a master quantity, and controlling said flow rate according to the difference of said telemetered signals.

17. A fluid flow rate controller comprising a Venturi tube, for setting up a differential substantially proportional to the square of the quantity rate of flow therethrough, a U-tube, a manometric liquid therein, a float for one surface of said liquid, contactor means positionable by said float, constant speed motor means, means movable by said motor relative to said positionable contactor means, all of said means being adapted to coact to transmit signals corresponding in duration with the square root of said pressure differential and hence directly proportional with said flow rate through said Venturi tube; master transmitter means comprising contactor means positionable through an extent corresponding with a predetermined flow rate, constant speed motor means, means rotated thereby relative to said contactor means, said master transmitter means being adapted to cyclically set up signals corresponding in duration with the predetermined flow rate set thereby; reversible motor means connected to both of said contactor means; and controlling means for said flow so connected with said reversible motor means as to progressively reduce any difference between said signals.

18. A fluid flow rate controller comprising differential producer means acted upon by said flow to set up a differential pressure substantially proportional to the square of the quantity rate of flow therethrough, pressure differential responsive means having a movable portion displaceable an extent proportional to said differential pressure, contactor means positionable by said movable portion, constant speed motor means, square root signalling means movable by said motor relative to said positionable contactor means, all of said means being adapted to coact to cyclically create signals corresponding in duration with the square root of said pressure differential and hence directly proportional to said flow rate through said differential producer; master transmitter means comprising constant speed motor means, first power signalling means rotated thereby, contactor means positionable through an extent corresponding with the predetermined flow rate, said master transmitter means being adapted to coact to cyclically create signals corresponding in duration with the predetermined flow rate set thereby; reversible motor means telemetrically connected to both of said contactor means; and controlling means for said flow so connected with said reversible motor means as to progressively reduce the difference between durations of said signals.

19. A fluid flow rate controller comprising a differential producer acted upon by said flow to set up a differential pressure corresponding therewith, pressure differential responsive means having a movable portion displaceable an extent corresponding with said differential pressure, contactor means positionable by said movable portion, substantially constant speed motor means, means operated by said motor relative to said positionable contactor means, all of said means being adapted to coact to create signals corresponding substantially in duration with said pressure differential and hence with said flow rate; contactor means positionable through an extent corresponding with a predetermined flow rate, contactor means movable by said motor means relative to said last mentioned contactor means to set up signals corresponding substantially in duration with the predetermined flow rate set thereby; and reversible motor means acting to bring the durations of said signals into equality.

20. In telemetric controllers for a plurality of variable quantities, transmitting means for cyclically creating a signal of a duration corresponding with a master quantity, a transmitting means for each of said variable quantities for cyclically creating an impulse of a duration corresponding therewith, and means for controlling each of said variable quantities jointly governed by said master signal to bring its respective impulse into equality therewith.

21. A transmitter for a master quantity, a second transmitter for a dependent quantity, each of said transmitters being adapted to cyclically create an impulse corresponding in duration with its respective quantity, means for bringing either transmitter into synchronism with the other responsive to lack of synchronism of one end of said impulses, and means for controlling said dependent quantity responsive to lack of synchronism of the other end of said impulses.

22. In apparatus for telemetrically relating one quantity with another quantity, an A. C. supply circuit; a transmitter for each quantity for cyclically creating a signal corresponding therewith and operated by a self-starting synchronous motor portion connectable with said circuit, each of said motors being adapted to operate in strict synchronism with the frequency of said A. C. supply; means conjointly governed by signals from both transmitters for relating said quantities as long as said transmitters operate in synchronism; synchronizing means for either of said transmitters governed by signals from the other; and inhibiting means connected to said circuit and said controlling means, said inhibiting means being adapted to prevent signals from said transmitters from affecting said relating means during the interval necessary for ensuring the restoration of synchronism following any discontinuity of current in said A. C. supply circuit.

23. In a telemetric controller, a master transmitter adapted to cyclically set up impulses of a duration corresponding with a predetermined controlled quantity, means for affecting said quantity and displaceable through an extent corresponding therewith, transmitter means for said displacement, and motor means for positioning said quantity-affecting means operatively connected to each of said transmitters and adapted to so move said quantity-affecting means as to bring the durations of said impulses into equality.

24. The method of controlling a plurality of dependent fluid flows in predetermined proportion to a master flow that comprises cyclically telemetering a signal of a duration proportional to the rate of master flow, cyclically setting up an impulse of a duration corresponding with the rate of each of said dependent flows, and controlling each of said dependent flows to bring the duration of each of said impulses into equality with that of said telemetered signal.

25. The method of predetermining the ratios of a plurality of quantity rates of flow controlled according to the relative duration of cyclical impulses corresponding with master and dependent flows that comprises at an operating station telemetrically altering the relation between each of said dependent flows and its corresponding impulse duration and telemetrically indicating at said operating station said master flow and said predetermined ratios to thus determine each quantity rate of flow.

26. In apparatus for telemetrically controlling a dependent quantity in relation with a master quantity; transmitting means for each quantity, each including means movable at constant speed and constrained to move in a predetermined path, means positionable relative to said movable means in correspondence with its said respective quantity, and contactor means jointly controlled by the coaction of said movable means with said positionable means to cyclically create a signal of a duration corresponding with its said respective quantity; and means jointly controlled by said signals to bring the value of said dependent quantity into a predetermined relation with that of said master quantity.

27. Telemetric control apparatus, as in claim 26, in which said movable means and said positionable means of one of said transmitting means are kinetically similar to the corresponding means of the other.

28. In apparatus for telemetrically controlling a dependent quantity in relation with a master quantity where said dependent quantity has a non-linear relation with a physically related variable, the combination of transmitting means for said master quantity, including means movable at constant speed and constrained to move in a predetermined path, means displaceable relative to said movable means through an extent proportional to said master quantity, and contactor means actuated by said movable means and said displaceable means to cyclically generate a signal of a duration proportional to said master quantity; transmitting means for said dependent quantity, including means movable at constant speed and constrained to move in a predetermined path, means displaceable relative to said movable means through an extent proportional to the then value of the said variable which is physically related with said dependent quantity, and contactor means actuated by said movable means and said displaceable means to cyclically generate a signal of a duration proportional to said dependent quantity; said movable means, displaceable means and contactor means being so adapted and arranged as to compensate for said non-linear relation between said dependent quantity and its said physically related variable; and means for controlling said dependent quantity jointly governed by said signals to bring their durations into equality.

29. In a telemetric controller for flow through a conduit, a motor mounted thereon and cyclically operable according to the differences of duration of signals corresponding with master and actual rates, a shaft operable thereby, a crank on said shaft, a butterfly valve in said conduit, an axle for said valve, a crank on said axle, and a link pivotally connecting said cranks, said cranks and link being adapted and arranged to give reduced movement to said valve for a given angular shaft movement when said valve is near its closed position.

30. In a system for maintaining two cyclically telemetered quantities in a predetermined proportion, the combination of means for cyclically telemetering each of said quantities to a receiver, means for controlling one of said quantities and telemetric receiver means cyclically responsive to each of said quantities connected to said controlling means and adapted to actuate said controlling means when said predetermined proportion is departed from.

31. In a system for maintaining a predetermined ratio between two quantities cyclically telemetered by signals of a time-function corresponding respectively therewith, the combination of telemetric receiver means respectively responsive to said cyclical signals and means conjointly actuatable thereby for controlling one of said quantities.

32. In a telemetric proportioning system, the combination of means to cyclically telemeter one quantity, means to telemeter a second quantity, and means conjointly governed by said telemetering means for controlling one of said quantities to maintain the first of said cyclically telemetered quantities in a predetermined proportion to the second.

33. In a telemetric proportioning system, the combination of means for cyclically telemetering the rates of delivery of two substances by signals having durations corresponding with said rates, and means cyclically governed by said telemetering means in correspondence with said signals and adapted to steadily control the delivery of one of said substances to continuously maintain said telemetered rates in a predetermined proportion.

34. In a telemetric proportioning system for a master and a dependent quality, the combination of means for cyclically telemetering said quantities by signals of a function of time respectively corresponding therewith in a predetermined relation including means for adjusting said relation and means responsive to said telemetered signals adapted to be movable only upon said signals departure from mutual correspondence, and means operatively connected to said signal responsive means and adapted to control said dependent quantity to restore said signals correspondence.

35. In a system for controlling a dependent telemetered quantity in a predetermined proportion to a master telemetered quantity, the combination of telemetering means for said quantities each comprising operatively connected transmitter, receiver and circuit means, said transmitter means for each quantity comprising means adapted to respond in a predetermined relation to said quantity including means for adjusting said relation for at least one of said quantities, signalling means controlled by said quantity responsive means and each connected to its said circuit means to cyclically create a signal therein corresponding with its said quantity, said receiving means comprising means cyclically responsive to said signals and means cyclically governed thereby corresponding to said signals difference; and means operable by said governed means and adapted to control said dependent quantity to substantially eliminate said signals difference.

36. In a system for controlling the flow rate of a fluid quantity in a predetermined proportion to the rate of a master quantity, the combination of telemetering means for said quantities comprising operatively connected transmitter, receiver and circuit means; said transmitter means for said quantities comprising a transmitter responsive to said master quantity and a transmitter for said fluid quantity comprising adjustable means coacting with said fluid to produce a pressure differential corresponding with its said flow rate having a portion movable to alter the relation between said quantity flow rate and said pressure differential, and means responsive to said pressure differential; said transmitter means including signalling means each controlled by its respective differential responsive means and each connected to its said circuit means to cyclically create a signal therein of a function of time corresponding with its respective quantity; said receiving means comprising means responsive to said signals, and means governed by said signal responsive means corresponding to said signals difference; and means operable by said signal difference governed means to control said dependent quantity to substantially eliminate said signals difference.

37. In a transmitter means for use in a system for controlling a dependent telemetered quantity in a predetermined proportion to a master telemetered quantity, the combination of means responsive to said quantity, means operatively connected thereto for cyclically signalling said response by signals corresponding in duration in a predetermined relation to said quantity, and means adapted to alter said predetermined relation.

38. In a telemetric system for proportioning one substance to another, the combination of means controlled by one of said substances for cyclically telemetering at regular intervals signals of a function of time corresponding with a quantity of said substance, means movable to control the second substance, and means governed by said telemetering means for operating said movable means to control the second substance in predetermined proportion with the quantity of said first substance.

39. In a telemetric system for proportioning one substance to another, the combination of means controlled by the quantity rate of one of said substances for cyclically telemetering at regular intervals signals of a time duration corresponding with said rate, means movable to control a second substance, and means governed by said telemetering means for operating said movable means to control the quantity rate of the second substance in predetermined proportion to that of the first substance.

ED S. SMITH, Jr.

DISCLAIMER 2,059,152.—*Ed S. Smith, Jr.*, Providence, R. I., TELEMETRIC CONTROLLER. Patent dated October 27, 1936. Disclaimer filed January 30, 1941, by the assignee, *Builders Iron Foundry*.

Hereby disclaims from the scope of claims 4, 5, 6, 7, 8, 9, 11, 12, 13, 23, 26, 27, 30, 31, 32, 34, 35, and 37 of said Letters Patent any method, combination, or system except one wherein the quantity controlled is a variable physical condition inherently subject to change with time, the value of which condition is regulated through signals corresponding with values of an independent master variable, and wherein a departure of said condition from a given value of said master variable is opposed by means controlled by said signals for maintaining said condition substantially at said given value.

And further disclaims from the scope of claims 38 and 39 of said patent any system or combination except one wherein a continuously flowing substance is controlled in predetermined proportion to another substance.

[*Official Gazette March 4, 1941.*]